United States Patent [19]

Kramer et al.

[11] 4,077,807
[45] Mar. 7, 1978

[54] BALL PEN INKS WHICH DO NOT FORM CLOGGING CRYSTALLINE MASSES WITHIN COPPER OR COPPER ALLOY INK CARTRIDGES

[75] Inventors: Steven H. Kramer; Glenn F. Roquemore, both of Escondido; James J. Joyce, Saratoga, all of Calif.

[73] Assignee: Gordon S. Lacy, Escondido, Calif.

[21] Appl. No.: 700,077

[22] Filed: Jun. 28, 1976

Related U.S. Application Data

[63] Continuation-in-part of Ser. No. 551,401, Feb. 20, 1975, abandoned, which is a continuation-in-part of Ser. No. 325,721, Jan. 29, 1973, abandoned, which is a continuation-in-part of Ser. No. 231,701, Mar. 3, 1972, abandoned.

[51] Int. Cl.² ............................................. C09D 11/04
[52] U.S. Cl. .................................. 106/24; 106/14; 106/23; 106/30; 106/31; 106/32; 106/27; 106/241
[58] Field of Search .................. 106/14, 20, 23, 27, 106/32

[56] References Cited

U.S. PATENT DOCUMENTS

| | | | |
|---|---|---|---|
| 2,528,390 | 10/1950 | Sayler | 106/22 |
| 2,882,172 | 4/1959 | Scobel | 106/22 |
| 3,659,951 | 5/1972 | Germann | 106/20 X |

FOREIGN PATENT DOCUMENTS

| | | | |
|---|---|---|---|
| 994,409 | 6/1965 | United Kingdom | 106/20 |
| 1,214,349 | 12/1970 | United Kingdom | 106/22 |

OTHER PUBLICATIONS

Ellis, Printing Inks, Reinhold Publishing Corp., N.Y., 1940, pp. 118-127 relied on.
Kirk-Othmer, Encyclopedia of Chemical Technology, 2nd Ed., vol. 2, pp. 588-602 relied on.
Op Cit. vol. 6, pp. 317-343 relied on.

*Primary Examiner*—Joan E. Welcome
*Attorney, Agent, or Firm*—Sellers and Brace

[57] ABSTRACT

New ball point pen ink compositions are utilized to enhance the performance and very substantially extend the service life of ball pen ink cartridges by preventing the formation of an ink flow-blocking mass at the entrance to the brass or bronze nib or a mass which prevents the movement of the follower plug in a copper alloy cartridge. This is accomplished by dispersing in the ink an antioxidant compound and/or a corrosion inhibitor compound effective to prevent oxygen and moisture, which enter the cartridge and pass into the ink, from reacting with the ball point ink and the metal constituents of the cartridge assembly to form metallic ions which react with ingredients of the ink proper to form a flow-blocking crystal mass.

7 Claims, 3 Drawing Figures

BALL PEN INKS WHICH DO NOT FORM CLOGGING CRYSTALLINE MASSES WITHIN COPPER OR COPPER ALLOY INK CARTRIDGES

This is a continuation-in-part application of our co-pending application Ser. No. 551,401, filed Feb. 20, 1975 now abandoned, which Ser. No. 551,401 is a continuation-in-part application of our application Ser. No. 325,721, filed Jan. 29, 1973, now abandoned, which Ser. No. 325,721 is a continuation-in-part application of our application Ser. No. 231,701, filed Mar. 3, 1972, now abandoned.

BACKGROUND OF THE INVENTION

Ink for ball point pens must be especially compounded for such unique usage. It differs greatly from pigmented printing inks on the one hand, and from aqueous fountain pen inks on the other hand. Thus it must have the required permanence of the color ingredient or dye, usually employed in a non-aqueous carrier, plus the necessary viscosity and flow characteristics for passing through the small clearance between the ball and its end socket. It must also be quick drying and non-spreading or non-smearing. Carriers which bleed or strike through to the reverse face of the writing paper must be eliminated.

The industry has succeeded in improving the writing quality of ball pen inks to a point at which they are far superior to earlier inks. However, one important and unresolved problem remains. Even these relatively good inks degrade with the passage of time and finally refuse to flow from the cartridge. This is the problem of shelf life or aging of the writing fluid. Aging occurs during the initial period of distribution to retail outlets in which it is shipped and sometimes stored in humid environments. Aging occurs on the shelves of the retailers. Finally it occurs during the period of usage by the final purchaser. Each of these periods may extend over many months. Ideally as long as there is any fluid in the supply cartridge or reservoir, the pen should be operative without hesitation or faltering.

Preserving the functional quality of an initially satisfactory formulation of ball point pen ink stored in a plastic cartridge is a very different problem from preserving its character in a sealed air-tight bulk container. Comparatively small quantities or "charges" of ball point pen ink are placed in small diameter tubes, commonly of polyethylene, polypropylene or other plastic, and one end of which is open to the atmosphere. The other end is closed by a metal nib terminally carrying a ball rotatable in its socket. The ball point pen cartridge includes the ball point ink, the metal nib including the rotatable ball, and the tube body secured to the metal nib, which tube body contains the ink. The open end of some larger diameter cartridges, too large for the ink to be retained by capillary action, may be plugged by a so-called "grease follower" or other type of "plug" which is not 100% impervious to oxygen and water and which moves into the cartridge as the ink flows out. During storage and use the ink of the cartridge is subject to the effects of contact with the atmosphere at this end even though closed by a plug.

Great quantities of these cartridge units including a writing nib are machine assembled, transported all over the world, and stored under all kinds of conditions. When purchased, or before being placed in use, a cartridge is simply thrust inside a tubular holder to provide a complete and instantly usable writing assembly. Such a newly assembled pen should function until the ink is entirely drained from the cartridge. If it does not, and today frequently it does not if the cartridge has aged for 1 to 3 years or less, under variable climatic conditions, the purchaser understandably is dissatisfied.

Examination of an aged disassembled pen which has failed to write has repeatedly shown what is known as "crystallization", that is, at the back or inner end of the bronze or brass tip which extends into the plastic body of the cartridge, a crystalline cap-shaped mass has accumulated which blocks the outlet passage going down the nib through which the ink flows to the writing ball at the point. This crystal mass chokes off the continuous flow of ink and makes writing impossible. When this occurs, there is no practical step the user can take to reverse the process, and the entire cartridge or writing instrument is simply discarded. What formed this crystallize mass or cap had not hitherto been known. It did not form at this location in all brass cartridges. It did not form there in the ink not in plastic cartridges. In brass cartridges usually of larger diameter and provided with a movable plug or closure at the open end spaced from the nib, the effect was noted not at the nib but at the interface of the plug and the ink. This effect caused the plug to freeze so that it could not follow the ink as its level approached the nib. The result was a vacuum which prevented the ink from flowing through the point.

Laboratory studies have now disclosed that the crystallization forms a heterogeneous mass of crystals known as a "crystal cap" through which ink cannot penetrate and which is characterized as follows:

1. This process is gradual;
2. During the early stages of crystal formation and before a cap is formed, the phenomena can account for starvation and skipping caused by larger crystals;
3. The crystalline mass is composed of metal salts and precipitated ink components and corrosion by-products;
   a. The consistency of the mixture resembles common asphalt in texture, viscosity and color.
   b. It can be several hundred microns to several millimeters in depth depending on the time and the particular ink formulation from which it was formed.
   c. A confirmation of the metallic content of the mass made by atomic absorption spectroscopy discloses a concentration of $Cu++$ and $Zn++$ approximately 300 times the normal concentration of these metals present elsewhere in the ink.

It has been observed that fountain pen inks, for example, may deposit sediment upon standing in an open container or pen due to evaporation of liquid which results in increased viscosity of the fluid. On the theory that something like this may have occurred in ball point pen ink, (1) volatile components were eliminated from the carrier, and (2) more impervious plastic cartridges were tried. The plastic body was even impregnated with metal flakes to prevent passage of liquid or gaseous components out through the walls. Those steps did not appreciably increase the storage stability. On aging, the resultant ink still produced gummy and/or crystalline particles which eventually choked off the flow.

Examination of many cartridges relative to the phenomenon of crystallization and crystal caps disclosed that the phenomenon did not occur with a nickel or stainless steel point but only with a point of brass, or other copper alloy such as bronze. It did not occur at the point when using a brass cartridge, but only in a plastic cartridge. It took place with various kinds of ball pen inks made by many manufacturers, the only significant difference being a variation in the length of time it took to develop a crystal cap in various of the ink formulas.

Until the present development all effort to eliminate the flow-blocking mass has failed to the continuous irritation of both users and manufacturers, such difficulty causing serious inventory and quality control problems for the latter.

OBJECTS OF THE INVENTION

It is a primary object of the present invention to provide an air-permeable ball point pen cartridge unit containing a charge of ink, which unit has a greatly extended service life with highly reliable and dependable writing characteristics.

Another object of the invention is the provision of a novel method of safeguarding the ink charge of a ball point pen against degradation due to migration in through the air-permeable plastic wall of the cartridge, of moisture and oxygen.

Another object of the invention is the provision of improved ball point pen ink formulations having the capability of reacting with moisture and oxygen migrating into the ink through the cartridge wall so as to prevent the oxygen and moisture from reacting with the point of brass or other copper alloy so as to form metallic compounds which are critically essential to the subsequent formation of flow-preventing crystals in the ink.

Another object of the invention is the provision of an improved ball point pen ink embodying one or more additives having as their function preventing the corrosion of the pen nib and subsequent reaction with ingredients of the ink to degrade the ink and form an ink flow-blocking mass at the nib inlet.

Another object of the invention is the provision of a plastic ball point pen cartridge equipped with a brass or copper alloy nib and charged with ink incorporating an additive effective to react with oxygen and moisture before the moisture and oxygen can reach and react with metallic constituents of the nib.

Another object of the invention is the provision of a method of treating ball pen inks, without affecting their writing capability, by which the formation of flow-preventing crystals in the presence of a brass or copper alloy nib is materially retarded.

A further object of the invention is the provision of a method of fortifying ball pen inks by the addition of an ingredient which, with affect upon the writing characteristics of the ink, "react" with oxygen and moisture entering the ink so as to prevent its reaction with the metal of the writing nib.

A still further object of the invention is the provision of a method by which, without affecting the writing characteristics of the ink, the formation of flow obstructing crystals is retared by including in the ink ingredient effective to protect surfaces of the corrodable metal nib exposed to ink.

Another object of the invention is the provision of an ink embodying means to prevent the formation of a flow-preventing crystal cap when placed in a plastic cartridge with a brass or other copper alloy nib.

SUMMARY OF THE INVENTION

The present invention relates to ball point pens and more particularly to the ink-containing cartridge of such pens and to the ink stored therein. More specifically, the invention comprises:
1. A method of fortifying ball pen inks to retard the formation of ink flow-blocking masses upon aging in a ball pen ink cartridge;
2. A ball pen ink cartridge with an air permeable wall, a brass or copper alloy nib, and an ink additive which "reacts" with oxygen and moisture so as to prevent corrosion of the nib;
3. A formula of general application to ball pen inks which retards the formation of crystals in the ink, especially in the presence of copper, brass, bronze and the like alloys in the cartridge structure (the ink itself is free, when made, of copper or copper alloy particles).

STATEMENT OF THE INVENTION

Figure 1:
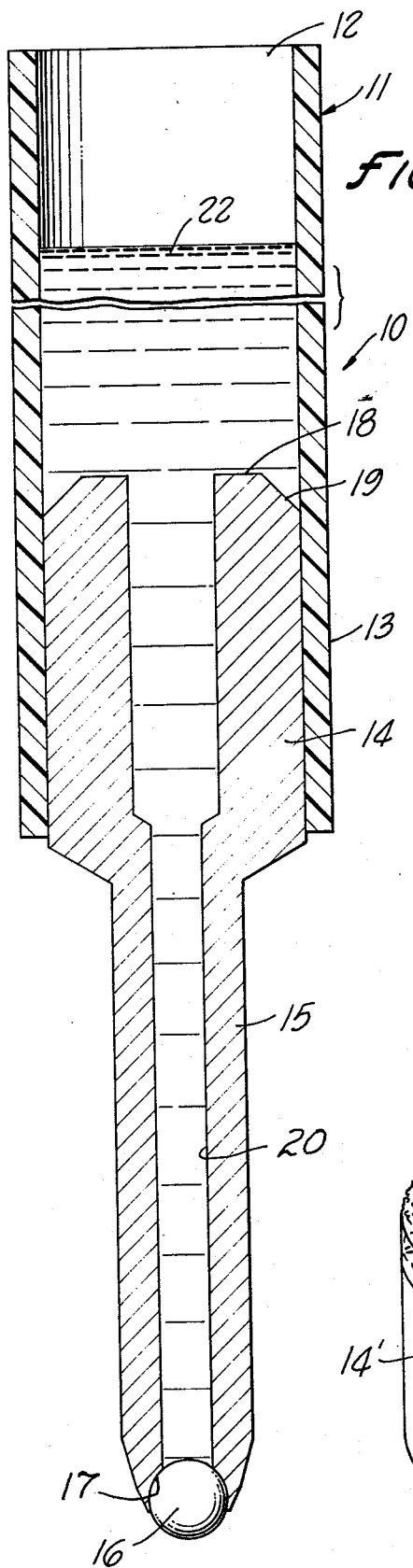
FIG. 1 is a longitudinal sectional view on an enlarged scale of a plastic ball point pen ink cartridge charged with ink formulated in accordance with the principles of the present invention and showing the condition of the ink charge, after many months of non-use under adverse conditions, as being free of any flow-blocking mass at the nib entrance.

It has now been discovered that the herein described strangulative coagulant and cap formation in ball point pen ink cartridges arises from oxidative and moisture reactive action set up at the brass-ink interface and results in the placing of copper and zinc compounds in solution. This interface is either (1) at the inner end of the copper or copper alloy nib in a plastic body cartridge, or (2) at a point where the interface of the follower plug and the ink contact the cartridge in a copper alloy body cartridge.

Corrosion of the brass or other copper alloy nib is now found to be an oxidative process produced by oxygen in the air which can pass through the plastic walls. The resulting "copper and zinc oxides" are thought to react with acidic ingredients in the ink to produce insoluble products, usually organic copper and/or zinc carboxylates. The ionic reaction is accelerated by the presence of water or moisture. In an acidic medium, copper rich spots of the metal point serve as cathodes and zinc spots as anodes. The zinc oxide so formed combines with ink-derived fatty acid to produce insoluble, organic zinc carboxylates. These carboxylates, due to their poor solvency power, produce an environment behind the nib which precipitates soluble dye and/or resin components from the ink formulation, thus accounting for the numerous varied crystal formations found in the crystal cap. In its early stages, such crystal formation may cause point clogging and "skipping" in laying down the ribbon of ink on the writing surface. This reaction occurs in the case of the plastic cartridge, particularly at the shoulder area of the metal nib. As previously noted, concentrations of $Cu++$ and $Zn++$ in the ink body in this area have been found to be approximately 300 times the normal concentration elsewhere in the ink. Such crystal cap, which resembles common asphalt in texture, viscosity and color, can be several microns to several millimeters in depth. A thickness of a few thousandths of an inch is sufficient to completely stop ink flow. When the cap occurs in a brass or other metal cartridge, it takes the form of a ring at the inner face of the plug, a condition interfering with the movement of the plug and the flow of ink.

It has been found that such precipitation and cap formation can be inhibited, and in terms of normal usage periods, can be substantially or completely prevented by incorporation into the ball point pen ink of one or more soluble substances which form the class of (a) antioxidants and (b) corrosion inhibitors. A combination of one member from each class is more effective and hence preferable to use than either class alone.

An effective antioxidant for the present purpose is defined as a substance soluble in solvents commonly used in ball pen inks, and which is capable of accepting free oxygen from its surroundings. An effective corrosion inhibitor for the present purpose is defined as ball pen ink-solvent soluble substance capable of preventing or inhibiting corrosion of copper or copper alloys, such as brass or bronze, under conditions existing in a ball pen ink cartridge, as defined.

Illustrative antioxidants are: Amines, such as, octylated diphenylamine; isopropoxy diphenylamine; aldol-alpha-naphthylamine; condensation product of acetone and diphenyl-para-phenylene diamine; mixed diaryl-para-phenylene diamines; alkyl-aryl-para-phenylene diamines; phenyl-beta-naphthylamine. Ar-ols, phenols, cresols, naphthols, and the like — such as, 2,2-methylene-bis-(4-ethyl-6-tert-butyl phenol); 2,2-methylene-bis-(4-methyl-6-tert-butyl phenol); styrenated phenol; 2,6-ditertiary butyl-4-methyl phenol; polymeric hindered phenol; hindered phenol; 2,6-ditertiary butyl-para-cresol; 2,2-thio-bis-(4-methyl-6-tert-butyl phenol); 1,1-thio-bis-(2-naphthol); lauryl-para-aminophenol; stearyl-para-aminophenol; N-acetyl-para-aminophenol; N-butyryl-para-aminophenol. Hydroquinones, such as, hydroquinone; 2,5-ditertiary-butyl-hydroquinone; hydroquinone monomethyl ether; 2,5-ditertiary-butyl hydroquinone; monotertiary-butyl hydroquinone; hydroquinone monobenzyl ether. Esters, such as: dilauryl thiodipropionate; ditertiary-butyl thiodipropionate; octadecyl-3-(3'5'-ditertiary-butyl-4')-hydroxy phenyl propionate. Ketones, such as: 4-dodecyloxy-2-hydroxybenzophenone; butylated hydroxyanisole. Heterocyclics containing N in a ring, such as, polymerized trimethyl dihydroquinoline.

Illustrative corrosion inhibitors are: Amines, such as, aromatic phosphate amine salts, including, bis-(octylphenyl) hydrogen phosphate diethylamine salt; octylphenyl dihydrogen phosphate diethylamine salt; mixtures of these two diethylamine salts; N,N'-disalicyol-1-2-propanediamine. Azoles, such as, benzotriazole; methyl benzotriazole; mercapto benzotriazole; soldium-2-mercapto-benzotriazole. Esters, such as, sorbitan fatty acid ester; sorbitan partial fatty acid ester. Acids, such as, trimer acid, nonyl phenoxy acetic acid. Others are hindered phenol and zinc dibutyl dithiocarbamate.

It is to be understood these listings are illustrative and are not limiting on the substances useful in the invention as antioxidants or corrosion inhibitors.

Color ingredients, soluble dyes and pigments are now known and used for ball point pen inks in amounts suitable for producing the desired color when such formulation is placed on paper. These dyes and/or pigments are dissolved/dispersed usually in a carrier (vehicle) provided by liquid polar organic solvent(s), such as, polyhydric alcohols which have a surface tension within the range of about 20 to about 60 dynes per square centimeter and preferably about 30 to 45 dynes per square centimeter. Typical of such alcohol solvents are: glycerol; benzyl alcohol; ethylene, propylene, butylene, amyl and hexylene glycols and their higher derivatives such as diethylene glycol, polyethylene glycol; mono- and dialkyl or mono- and diaryl or mixed ethers of glycols such as ethylene and diethylene glycol phenyl ethers. Generally, the polar organic solvent(s) is present in an amount of about 30 weight percent to about 70 weight percent; more commonly, about 35 to 55% of solvent(s) is present.

The ball pen ink includes from zero up to about 25 wt % of fatty acid; more commonly about 1 to 16 wt % of fatty acid.

The fatty acid component is chosen for the properties of:
1. Increasing dye solubility;
2. Imparting lubricity to the metal ball in writing;
3. Enhancing color development of the dye.

Examples of suitable fatty acids are:
1. Oleic acid;
2. Neodecanoic acid;
3. Generally organic acids whether straight chain or branched, C-4 to C-20 in length, preferably saturated and derived from either synthetic or natural sources. Examples of these include 2-ethylhexanoic acid, nonanoic acid, palmitic acid, etc.

The ball pen ink includes from zero up to about 50 wt % of resin; more commonly, about 5 to 40 % of resin.

The resin component is usually selected for the properties of adjusting the viscosity of the ink to suitable levels. Examples of suitable resins are coumarone indene, ketonealdehyde condensate, pine tar derived resins, zein, coal tar resins, etc.

To the typical ink so compounded is added an amount of ink soluble antioxidant and/or an ink soluble corrosion inhibitor which final ink must pass the "Twenty Four Accelerated Corrosion Test" and the "Accelerated Heat Aging Test". Preferably the final ink should also pass the "Six Day Accelerated Corrosion Test" and the "Two Hour Accelerated Copper Alloy Powder Weight Loss Test", each of which tests, named above, is set forth hereinbelow.

The defined antioxidant is usually present in the ball pen ink of the invention in an amount of about 0.5 to 10 weight percent. More commonly, the antioxidant is present in an amount below about 5%; and usually in an amount of about 1–3 weight percent.

The defined corrosion inhibitor is usually present in the ball pen ink of the invention in an amount of about 0.01 to 5 weight percent. More commonly, the corrosion inhibitor is present in an amount below about 3%; and usually in an amount of about 0.05–2 weight percent.

When both antioxidant and corrosion inhibitor are present in the ball pen ink of the invention, it is desirable to maintain the relative proportion of antioxidant/corrosion inhibitor at about the same proportions given in the aforesaid weight percentages, for example, 2 wt % of antioxidant and 1 wt % of corrosion inhibitor.

The weight percentage given for antioxidant and for corrosion inhibitor are in conformity with the formulation shown in the various Tests and Examples, herein, that is, antioxidant and corrosion inhibitor are weight percent based on 100 parts of base ink (see Tests and Examples where the total weight of final ink equals 100 plus the weight of antioxidant and/or corrosion inhibitor).

In summary, the ball pen ink (i) of the invention consists essentially of:

1. polar organic solvent, about 30–70 weight percent;
2. soluble fatty acid, about 1–25 weight percent;
3. soluble resin, about 5–50 weight percent;
4. suitable color ingredient;
5. a member of the class consisting of (i) soluble antioxidant, about 0.5–10 weight percent; (ii) soluble corrosion inhibitor for copper or copper alloy, about 0.01–5 weight percent; and (iii) mixture of said (i) and said (ii), in individual amounts as recited for (i) and (ii); where said percents of said components (1), (2), (3), (4) and (5), respectively, are based on the sum of said components (1), (2), (3) and (4), aforesaid ink I is free of copper or copper alloy particles; has a viscosity of about 2,000–25,000 centipoises; and a pH of about 4.5–9.0; and the aforesaid ink I ingredients minus said antioxidant and said corrosion inhibitor make a ball pen ink (II) which is characterized by the formation of ink insoluble corrosion products of copper or copper alloy formed by reaction of ink ingredients with copper or copper alloy present in the structure of a ball pen ink cartridge containing said ink II, in the presence of oxygen and moisture within said ball pen ink cartridge containing said ink II, which ink insoluble corrosion products accumulate inside the body of said ink II cartridge and starve, or choke off, the flow of said ink II to the ball, causing excessive skipping or starvation in the line written with said ink II, prior to the time that the amount of said ink II in said cartridge has been consumed in writing operation or failure during storage; whereas aforesaid ink I forms substantially less of said corrosion products under identical exposure as evidenced by decreased skipping or starvation in the line written with said ink I, where said ink I has a Corrosion Difference Ratio (CDR) of about 0.15–1.00 in the 24 Hour Accelerated Corrosion Test described in this specification, and passes the Accelerated Heat Aging Test also described in this specification.

In compounding, typically, the solvent(s) and fatty acid(s) are first measured into a jacketed kettle and warmed to about 60° C – 90° C with agitation. Resin is then added and agitated until dissolved; the dyes and corrosion inhibitor are then mixed in; and the antioxidant is added. Any insoluble matter is removed by filtration or centrifuge, and final adjustment is made for viscosity and pH. Viscosity falls in the range from about 2000 centipoise to about 25,000 centipoise but may be higher for special types of ball pen inks. pH usually falls in the range from about 4.5 to 9.0.

The ink batch can be shipped in bulk, or may be packaged in containers from 55 gallons down to 1 pint in size, for use by a plant whose machinery charges it into ball pen reservoir cartridges.

TEST 1: SIX DAY BRASS POINT WEIGHT LOSS

Corrosion inhibitor alone or antioxidant alone has some effect in reducing corrosion of the brass point but used together they give much more than a simple additive effect as can be seen from the following test data.

Cartridges were placed entirely within a septum bottle which contained a totally water-saturated, pure oxygen atmosphere, and the whole assembly then maintained for 6 days at 80° C. This test is intended to be comparable in its aging effect to a shelf life in excess of one year under normal conditions. The brass points were weighed before assembly and at the end of the test cleaned off with solvent and again weighed.

| | FORMULAE #2 - BLUE | | | |
|---|---|---|---|---|
| | A | B | C | D |
| Benzyl Alcohol | 22 | 22 | 22 | 22 |
| Ethylene Glycol Phenyl Ether | 22 | 22 | 22 | 22 |
| Oleic Acid | 12 | 12 | 12 | 12 |
| 1, 2-Propylene Glycol | 4.7 | 4.7 | 4.7 | 4.7 |
| Blau Base KG (Solvent Blue 64, BASF) | 15.9 | 15.9 | 15.9 | 15.9 |
| Victoria Blue Base F4R (Solvent Blue 2, BASF) | 7.5 | 7.5 | 7.5 | 7.5 |
| Hexane Triol Phthalate Resin | 15.9 | 15.9 | 15.9 | 15.9 |
| 2, 2-Methylene bis (4-methyl-6-tertiary-butyl-phenol (antioxidant) | 0 | 2.0 | 0 | 2.0 |
| Benzotriazole (corrosion inhibitor) | 0 | 0 | 0.1 | 0.1 |
| Total weight in grams | 100.0 | 102.0 | 100.1 | 102.1 |
| Percentage Weight Loss of nib by corrosion | 0.82 | 0.48 | 0.72 | 0.02 |

TEST 2 — SIX DAY ACCELERATED CORROSION TEST (VISUAL)

Evidence of the deterioration of a ball point pen ink in a conventional vapor-permeable plastic cartridge, such as a polypropylene cartridge, as measured by the corrosion of the brass nib of the cartridge containing the ink, can be seen from the following accelerated aging test.

Ball point pen inks were formulated in accordance with the present invention and using various antioxidants and/or corrosion inhibitors as follows:

| FORMULAE #1 - BLUE | |
|---|---|
| | Parts by Weight |
| Ethylene Glycol MonoPhenyl Ether | 20 |
| Butylene Glycol-1,3 | 20 |
| Fatty Acid (Oleic Acid Type) | 12 |
| Solvent Blue 5 Dye (such as Victoria Pure Blue BO Base, American Cyanamid, Hectolene Pure Blue BO Base, Dye Specialties, Inc,) | 6 |
| Solvent Violet 8 Dye (such as Methyl Violet Base, DuPont, American Cyanamid, Tenneco Chemicals Co.) | 4 |
| Resin, Ketone condensation type | 35 |
| Resin, polyvinylpyrrolidone type | 3 |
| Corrosion inhibitor | 1.0 |
| Antioxidant | 2.0 |
| Total | 103.0 |

The corrosion test performed was an accelerated test followed by visual observation of corrosion of the heel and shoulder portions of a brass nib. The antioxidant and/or corrosion inhibitor to be tested were mixed into Formula #1.

When an antioxidant was being tested, 1.0% of a corrosion inhibiting mixture of diethylamine salts of bis-(octylphenyl) hydrogen phosphate and of octylphenyl dihydrogen phosphate was also present in the Formula I ink.

When a corrosion inhibitor was being tested, 2.0% of 2,2-Methylene-bis-(4-methyl-6-tertiary-butyl phenol) antioxidant was also present in the Formula I ink.

The additive containing ink was placed in a commercial plastic cartridge with a sealed ball pen tip. The tip end of the plastic cartridge was then inserted into a reaction vessel. Oxygen and 1/10 cc. of Distilled Water were also inserted into the reaction vessel. The whole assembly was then aged for 6 days at 80° C. The brass points were then retrieved, washed clean, and microscopically examined at 60 X for corrosion.

A rating of "Pass" or "Fail" was assigned to each additive based on the results of this examination. A "Fail" rating was assigned when the lathe marks normally present on the heel of the point, could not be easily discerned or where noticeable cavitation as a result of corrosion has taken place. Care was taken to not assign a "Fail" rating where the heel of the nib was only discolored but not actually corroded as described above.

Antioxidants and corrosion inhibitors receiving a "Pass" rating by this test are:

TABLE A

Antioxidant 1. 2, 5-Ditertiary Butyl Hydroquinone
2. Hydroquinone MonoMethyl Ether
3. 4-Dodecyloxy-2-HydroxyBenzophenone
4. MonoTertiary Butyl Hydroquinone
5. Butylated Hydroxyanisole
6. Hydroquinone
7. 2,2-Methylene-bis (4-Ethyl-6-Tert-Butyl Phenol)
8. Octylated Diphenyl Amine
9. Hydroquinone Monobenzyl Ether
10. isopropoxy Diphenylamine
11. Aldol Alpha-Naphthylamine
12. Polymerized Trimethyl Di-hydroquinoline
13. Condensation product of diphenyl amine and acetone
14. Diphenyl-para-Phenylenediamine
15. Phenyl beta naphthylamine; isopropoxy diphenylamine; diphenyl para phenylene diamine; mixture
16. 2, 6-Ditertiary Butyl-4-Methyl Phenol
17. Octadecyl-3-)3, 5 Ditertiary-Butyl-4-Hydroxy Phenol Propionate)
18. Polymeric Hindered Phenol
19. N-Acetyl-p-aminophenol
20. N-Butyryl-p-aminophenol
21. Lauryl-p-aminophenol
22. Stearyl-p-aminophenol

Corrosion Inhibitor

23. Bis-(octylphenyl) hydrogen phosphate diethylamine salt
24. Zinc Dibutyldithiocarbamate
25. Trimer Acid
26. N,N--disalicylol-1,2-propane diamine
27. Benzotriazole
28. Methyl Benzotriazole
29. Mixture of diethylamine salts of bis (octylphenyl) hydrogen phosphate and octylphenol dihydrogen phosphate

TEST 3

TWO-HOUR ACCELERATED COPPER ALLOY POWDER WEIGHT LOSS TEST

A quantity of powdered brass is obtained from the same brass as used for points of ball point pens. Such a sample representative had the following characteristics:

| | |
|---|---|
| Cu | 58.5 to 60.0% weight |
| Pb | 3.20 to 3.80% |
| Fe | 0 to 0.15% |
| Sn | 0 to 0.20% |
| Ni | 0 to .15% |
| Zn | Remainder |
| Grain size: | .030 mm maximum |
| Elongation: | 2% in 2" |
| Tensile strength: | 78,000 –88,000 psi |
| Mesh size: | 40/60 (Tyler Mesh) |

A liquid carrier (vehicle) consisting of a mixture of polyhydric alcohol and saturated carboxylic acid is used as a representative standard for interaction with the brass sample contained in a sealed moisture-saturated atmosphere at elevated temperature. 30 ml. of clean dry brass powder is weighed to the nearest 0.0001 gm. into a 125 ml. reaction vessel. 30 ml. of a 50:50 by weight test mixture of ethylene glycol Monophenyl ether:Oleic acid, containing either 10% antioxidant or 5% corrosion inhibitor or both, is then added by Class A Pipet. 1.5 ml. of Distilled Water is then charged onto a ½ × ½ × 1-½ inches cellulose sponge which is then suspended over the dispersion of metal in the reaction vessel, by a cotton thread. A 1-½ inches Teflon coated stirring bar is then added and the reaction vessel sealed with septum and aluminum crimp. The bottle containing the sponge, metal, stirring bar and test solution is then flushed with pure oxygen by syringe needle inserted through the elastic septum which reseals upon withdrawal of the needle. This assembly is then placed on a 100° C hot plate equipped with magnetic stirrer operating at 80 rpm. for two hours, after which the solution is placed on a tared "Alundum" Soxhlet cup and extracted for one hour with methylene chloride in a Soxhlet extractor. The cup and metal are then dried and weighed to determine the weight of brass lost to the test mixture.

The above test, in the absence of any corrosion inhibitor or antioxidant additive, showed a weight loss of the brass of greater than 2%. In comparison, it has been found that an additive, e.g. up to 10% antioxidant or up to 5% corrosion inhibitor or any combination of additives from the two classes which do not exceed a total weight of about 15% and which results in no greater than 2% weight loss of brass, as determined by the present test, can advantageously be used to inhibit obstructive crystal formation in ball point pen inks which include acidic ingredients which effect corrosion of the metal point, as for example, ink containing dyes, solvents previously mentioned, fatty acid or acids, and possibly resins in their compositions.

TEST 4

TWENTY-FOUR HOUR ACCELERATED CORROSION TEST

Another accelerated corrosion test having certain advantages and superior to the other tests has been found to provide highly reliable and precise numerical results. This test is carried out under precise conditions using a control so that a direct comparison can be obtained between identical cartridges one of which contains a sample of the ink with additive(s) and the other of which contains the same ink but no additive, i.e., a control ink.

These two samples are subjected to identical environmental conditions of a severe nature for a designated period following which the simulated nibs are removed and their weights compared to determine the extent of the resulting corrosion, if any, on each nib.

The simulated nibs used for the test are machined from copper alloy stock and are shaped similarly to a conventional ball point nib except that there is no axial well or bore, thereby eliminating the problem of ink removal preparatory to weighing the control and test nibs at the end of the 24 hour test period. The nibs are nickel plated to prevent corrosion of the nib area not exposed to ink, following which the end to be placed in contact with the ink is machined to remove the nickel coating so as to expose the copper alloy to the ink. Each nib is then accurately weighed in grams to high precision, i.e., to six or seven decimal places, using precision weighing equipment, such as, the Electro-Balance manufactured by Ventron Instrument Corp., Paramount, California.

Thereafter, identical plastic ink cartridges are assembled to the larger end of each nib, one cartridge being charged with formula #1 — blue — base ink without any additive to provide a control cartridge.

The second cartridge is charged with the same ink base containing one or more specific additives to be tested for corrosion inhibiting characteristics.

The two cartridge samples are then placed in a reaction vessel and subjected to controlled environmental conditions for the 24 hour test period. During the test period the reaction vessel is maintained charged with an atmosphere of oxygen saturated with water vapor under a uniform pressure, $P \pm 0.05$ psi, at a constant temperature, $T \pm 0.2°$ C; the saturated oxygen is agitated and circulated through the chamber at a controlled rate, such as, 85–110 cc per minute. A water bath for saturating the oxygen is maintained at a suitable uniform temperature, such as 15° C.

At the end of the 24 hour test period the samples are removed from the reaction vessel and the two nibs are disassembled and cleaned before reweighing each to the same number of decimal places as the first weighing. The changes in weight of the two nibs are then utilized to calculate a quotient representing the corrosion difference ratio as follows:

$$\text{Corrosion Difference Ratio (CDR)} = \frac{W_c - W_t}{W_c}$$

where $W_c$ is the weight loss of the control nib (no additive); and $W_t$ is the weight loss of the test nib (with additive).

Let it be assumed that a corrosion inhibitor is employed which is completely effective to prevent corrosion during the test period. In this case, the value of $W_t$ will be 0.0000. Let it be further assumed that the weight loss $W_c$ of the control nib is 0.2000. Thus:

$$CDR = \frac{0.2000 - 0.0000}{0.2000} = 1.00$$

Under these ideal conditions the CDR quotient is a maximum of 1.00. Under less than ideal conditions and with some corrosion occuring in the test sample, the CDR quotient will be something less than 1.00, for example, 0.90 or 0.75. If the additive under test has only limited effectiveness the CDR quotient may be 0.10 or even less. If it has no inhibiting effectiveness the CDR quotient will be 0.00. (Some additives have given CDR's of less than zero, which means the additive ... corrosion. This test is a means for rapidly screening potential additives and eliminating those having little potential). Stated in another way, an additive having a CDR of 1.00 is perfect and the nearer the CDR is to 1.00 the better the additive.

It is therefore apparent that the described 24 hour acceleration test provides a definite numerical quotient enabling one to determine with precision the relative effectiveness ratings of different compounds of interest in corrosion control. In our opinion CDR values of 0.15 or lower are sufficiently ineffective to have no commercial value as corrosion inhibitors in a ball point pen ink composition. CDR quotients in excess of 0.15 have commercial potential, the lower value quotient being suitable for less hostile environments and those of higher value, such as, above about 0.35, having superior characteristics in maore severe operating environments.

A series of antioxidants and corrosion inhibitors were tested under the following uniform conditions, namely, (1) oxygen atmosphere saturated with water vapor; (2) $8.5 \pm 0.05$ psi; (3) $80 \pm 0.2°$ C; (4) oxygen flow rate of 85-110 cc per minute; (5) water bath for saturating oxygen held at 15° C; (6) agitation of atmosphere in the reaction vessel.

The base ink formula used in all the tests reported in this Test 4 was formula #1-Blue.

| Component | Weight Parts |
|---|---|
| Ethylene Glycol Monophenyl Ether | 20. |
| Butylene Glycol-1,3 | 20. |
| Fatty Acid (oleic acid type) | 12. |
| Solvent Blue 5 dye (such as Victoria Blue BO base, American Cyanamid, Hectolene Pure Blue BO base, Dye Specialties, Inc.) | 6. |
| Solvent Violet 8 dye (such as Methyl violet base, DuPont, American Cyanamid, Tenneco Chemicals Co.) | 4. |
| Resin, ketone condensation type | 35. |
| Resin, polyvinylpyrrolidone type | 3. |
| Total | 100. |

NOTE* There is no Test 4A in order to avoid confusion with Table A.

TEST 4B

Certain antioxidant compounds were tested ALONE by adding two (2) wt pts of compound to 100 wt pts of formula #1 ink base. The CDR quotient (CDR's) of each of these antioxidant compounds is listed in Table B.

TABLE B

| No. | Compound | CDR |
|---|---|---|
| 1 | 2,5-ditert-butyl hydroquinone | 0.37 |
| 2 | Hydroquinone monomethyl ether | 0.33 |
| 3 | 4-dodecyloxy-2-hydroxybenzophenone | .39 |
| 4 | butylated hydroxyanisole | .50 |
| 5 | hydroquinone | .36 |
| 6 | 2,2-methylene-bis(4-ethyl-6-tert-butyl phenol) | .37 |
| 7 | polymerized trimethyl dihydroquinoline | .39 |
| 8 | condensation product of diphenyl-amine and acetone | .14 |
| 9 | phenyl beta-naphthylamine; isopropoxy diphenylamine; diphenyl phenylene diamine- a mixture of the three amines | .89 |
| 10 | 2,6-ditert-butyl-2-methyl phenol | .38 |
| 11 | 2,2-methylene-bis(4-methyl-6-tert-butyl phenol) | .35 |
| 12 | Hindered phenol | .31 |

TEST 4C

Certain corrosion inhibitor compounds were tested ALONE by adding one (1) wt pt of compound to 100 wt pts of formula #1 base ink. The CDR of each of these compounds is listed in Table C.

TABLE C

| No. | Compound | CDR |
|---|---|---|
| 13 | nonyl phenoxy acetic acid | −0.02 |
| 14 | diethylamine salts of bis (octylphenyl) hydrogen phosphate and octylphenyl dihydrogen phosphate | 0.03 |
| 15 | mercapto benzothiazole | .07 |
| 16 | zinc dibutyl dithiocarbamate | −0.18 |
| 17 | sorbitan fatty acid ester | .03 |
| 18 | benzotriazole | .85 |
| 19 | methyl benzotriazole | .76 |
| 20 | bis(octylphenyl) hydrogen phosphate diethylamine salt | −0.03 |
| 21 | o-toluidine | .05 |
| 22 | dicyclohexylamine | .29 |
| 23 | 2-phenylbenzothiazole | .09 |

TEST 4D

Certain antioxidant (AO) compounds were tested in COMBINATION with the corrosion inhibitor "mixture of diethylamine salts of bis (octylphenyl) hydrogen phosphate and octylphenyl dihydrogen phosphate" — No. 14 of Table C. The test ink consisted of 100 wt pts of formula #1 base ink, 2 wt pts of the AO Compound being tested, and 1 wt pt of said No. 14 corrosion inhibitor. The control ink contained no additive. The CDR quotient obtained in this COMBINATION testing are listed in Table D.

TABLE D (Formula #1 ink + 2 wt pts named AO compound + 1 wt pt No. 14 CI compound)

| No. | Compound | CDR |
|---|---|---|
| 24 | 2,5-ditertiary butyl hydroquinone | 0.80 |
| 25 | hydroquinone monomethyl ether | .49 |
| 26 | 4-dodecyloxy-2-hydroxybenzophenone | .63 |
| 27 | 2,5-ditertiary amyl hydroquinone | .71 |
| 28 | monotertiary butyl hydroquinone | .57 |
| 29 | butylated hydroxyanisole | .37 |
| 30 | hydroquinone | .46 |
| 31 | 2,2-methylene-bis(4-ethyl-6-tert-butyl phenol) | .46 |
| 32 | octylated diphenylamine | .69 |
| 33 | hydroquinone monobenzyl ether | .60 |
| 34 | isopropoxy diphenylamine | .86 |
| 35 | aldol alpha-naphthylamine | .80 |
| 36 | polymerized trimethyl dihydroquinoline | .71 |
| 37 | styrenated phenol | .80 |
| 38 | condensation product of diphenylamine and acetone | .89 |
| 39 | diphenyl para-phenylenediamine | .83 |
| 40 | phenyl beta-naphthylamine; isopropoxy diphenylamine; diphenyl phenylene diamine- a mixture of the three amines | .89 |
| 41 | 2,6-ditertiary butyl-4-methyl phenol | .71 |
| 42 | octydecyl-3-(3′, 5′-ditertiary butyl-4′) hydroxy phenyl propionate | .71 |
| 43 | polymeric hindered phenol | .54 |
| 44 | hindered phenol | 0.66 |
| 45 | mixed diaryl-para-phenylenediamine | .74 |
| 46 | blend of diaryl and alkyl-aryl-para-phenylenediamines | .69 |
| 47 | dilauryl thiodipropionate | .74 |
| 48 | ditertiary butyl thiopropionate | .74 |
| 49 | phenyl-beta-naphthylamine | .73 |
| 50 | 2,6-ditertiary butyl-para-cresol | .77 |
| 51 | 2,2-thiobis-(4-methyl-6-tert-butyl phenol) | .74 |
| 52 | 1,1-thiobis-2(2-naphthol) | .63 |
| 53 | 2,2-methylene bis (4-methyl-6-tert-butyl phenol) | .37 |

TEST 4E

Certain corrosion inhibitor (CI) compounds were tested in COMBINATION with the antioxidant "2,2-methylene-bis(4-ethyl-6-tert-butyl phenol)" which is No. 6 of Table B. The test ink contained 100 wt pts of formula #1 base ink, 2 wt pts of the No. 6 AO compound, and 1 wt pt of the corrosion inhibitor compound. The control ink contained no additive. The CDR quotients obtained in this combination testing are listed in Table E.

TABLE E (Formula #1 ink + 2 wt pts of No. 6 AO + 1 wt pt of named CI compound)

| No. | Compound | CDR |
|---|---|---|
| 54 | nonyl phenoxy acetic acid | 0.69 |
| 55 | mixture of diethylamine salts of bis (octylphenyl) hydrogen phosphate and octylphenyl dihydrogen phosphate | .46 |
| 56 | mercapto benzothiazole | .91 |
| 57 | zinc dibutyl dithiocarbamate | .94 |
| 58 | Na-2-mercapto benzothiazole | .69 |
| 59 | sorbitan fatty acid ester | .74 |
| 60 | sorbitan partial fatty acid esters | .46 |
| 61 | hindered phenol | .66 |
| 62 | benzotriazole | .31 |
| 63 | methylbenzotriazole | .31 |
| 64 | bis(octylphenyl) hydrogen phosphate diethylamine salt | .46 |
| 65 | dibutyl thiourea | −0.14 |
| 66 | diethyl thiourea | −0.17 |

The benefit gained by using a combination of antioxidant and corrosion inhibitor is demonstrated by comparing the very low CDR compounds of Table C, with the combination CDR rating of Table E. No. 54–57, 59 and 64 of Table E show in all cases combination CDR's greater than the value obtained by simple addition of the individual compound CDR ratings obtained alone. Except for No's 56 and 54, the combination CDR was astonishingly higher than the simple addition value.

Complete evaluation of a compound requires not only an individual test but also a combination test, as economics may dictate a "poor" individual performer is the optimum commercial performer.

TEST 5

ACCELERATED HEAT AGING TEST

The following formula containing the additives is prepared as specified above for Formula #1-Blue. To this formula either an antioxidant or corrosion inhibitor or both are added in the amounts specified. The ink is then charged into 5 brass and 5 plastic cartridges and medium size ball points fitted to them. The brass cartridges are then placed in an oven maintained at 60° C. for 5 weeks. At the end of every week three of the cartridges are taken out, written out for 100 cycles (ovals) on a Hartley or Anja General Services Administration writing machine and then returned to the oven for another week's aging. The two cartridges which are not written out weekly and saved for the full five weeks and then written out for 800 cycles (ovals). The plastic cartridges are treated the same except that the oven temperature is 55° C.

The cartridges must then write without excessive skipping or starvation in the written line, and there must be a good color laydown, with no change of color.

TEST 5A

In this test series various dyes were added to a base ink of Formula #1, containing 1 wt % of corrosion inhibitor: mixture of diethylamine salts of bis (octylphenyl) hydrogen phosphate and octylphenyl dihydrogen phosphate, and 2 wt % of antioxidant: 2,2-methylene-bis(4-methyl-6-tert-butyl phenol). The Accelerated Heat Aging Test results of the final inks tested are given below for brass tubular body and for plastic tubular body.

TABLE 5A

| Final Ink | Brass Body | Plastic Body |
|---|---|---|
| Black 587 | Good | Fair |
| Black 130 | Good | Good |
| Black 918 | Good | Good |
| Blue 353 | Excellent | Fair |
| Blue 904 | Excellent | Excellent |
| Blue 373 | Excellent | Fair |
| Red 332 | Excellent | Excellent |
| Red 331 | Excellent | Excellent |
| Green 295 | Good | Good |

TEST 5B

In this test series, dyes as used in Test 5A were added to a Formula #1 base ink containing 0.5 wt % of benzotriazole. Benzotriazole was the sole additive in this test series. The Accelerated Heat Aging Test results of the final inks tested are given below for brass tubular body and for plastic tubular body.

TABLE 5B

| Final Ink | Brass Body | Plastic Body |
|---|---|---|
| Black 587 | Failed in one week | Poor |
| Black 130 | Failed in 2nd week | Poor |
| Black 918 | Failed in one week | Failed in one week |
| Blue 353 | Failed in 3 weeks | Failed in 3 weeks |
| Blue 904 | Passed | Failed in 3 weeks |
| Blue 373 | Failed in 1 week | Passed |
| Red 332 | Failed in 1 week | Poor |
| Red 331 | Failed in 1 week | Failed in 1 week |
| Green 295 | Passed | Failed in 4th week |

Conclusion drawn from Test 5B: Benzotriazole is unsuitable for use as a corrosion control additive in ball pen inks.

TEST 5C

Using the Formula #1 base ink containing as the sole additive: 1-Hydroxybenzotriazole Monohydrate, two final inks were tested according to the Accelerated Heat Aging Test in both brass tubular body and plastic tubular body. Blue 904 and Red 311 final inks failed within three weeks in each body.

GELATION (THICKENING) IN TESTS AND STORAGE

It was observed with both triazoles tested in Test 5 that failure was apparently the result of crystals forming within the ink which results in gelation or thickening of the ink.

It was also observed than on ordinary shelf storage of ink cartridges of the Test 5B type inks, these cartridges failed to write and inspection of the tubular body showed that the ink had gelled (thickened) to the point that it would not flow.

This gelation phenomenon further renders the triazole containing inks unsuitable for ball pen ink purposes.

The ball pen ink fortified in accordance with the present invention is positioned in a cartridge as illustrated in the drawing. In FIG. 1 there is shown a ball point pen cartridge, designated generally 10, including an elongated tubular plastic body 11 open to the atmosphere at its upper end 12. The body 11 is sufficiently small in diameter that capillary action prevents ink from escaping from the open end. The body retains the ink but has a limited permeability in a manner characteristic of plastics, to the extent that some air and moisture can pass therethrough and into the ink. The lower end 13 of the cartridge body has a snug frictional fluidtight fit over the enlarged upper end 14 of a tubular brass nib or point 15. The smaller diameter lower tubular end of the nib 15 carries a rotary ball 16 seated in a semi-spheroid socket 17. The upper end of the nib through which the ink enters, includes an annular heel 18 and a chamfered shoulder 19. This chamfered surface serves as a pilot to facilitate assembly of the cartridge to the nib. The interior of the cartridge is charged with ink 22 adapted, in the manner common to ball pens to flow downwardly through channels 20 of the nib 15 to the ball 16 to be applied to a writing surface by the rotation of said ball.

In FIG. 1 the cartridge is in an operative condition and the ink is free to flow from the pen as described. This condition exists when the cartridge is new and desirably should continue until all of the ink in the cartridge has been used. The wall of the plastic body 11 of the cartridge permits moisture-laden air to pass therethrough and into the ink. With common unfortified ball pen ink in the cartridge, the oxygen in the air and the water, aided by acidic components inherent in ball pen ink, corrode the brass point. The by-products of this corrosion then combine with other ingredients of the ink formula to provide a crystal mass which begins at the shoulder 19 of the point and gradually works its way up to the heel 18 and finally results in a cap which entirely circles the end of the nib and closes the passage 20 therethrough, preventing the flow of ink downwardly to the ball 16. This result is clearly illustrated in FIG. 2 in which similar parts are designated by the same reference characters as on FIG. 1 but with a prime added thereto, the cap being shown at C. An enlarged showing of the cap is found in FIG. 3.

Figure 2:
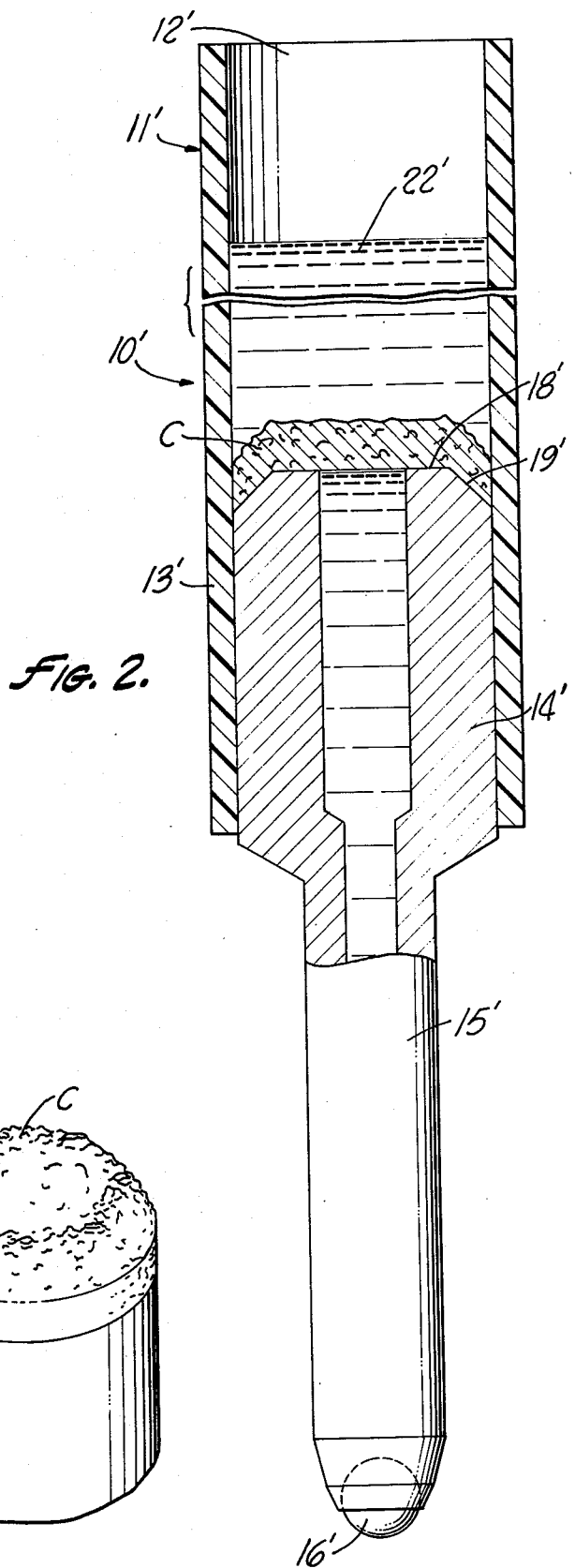
FIG. 2 is a sectional view of an identical cartridge charged with the same ink except none of the invention additive ingredients are present and illustrating a typical cap-like mass overlying the entrance end of the nib which formed as the ink aged.
Figure 3:
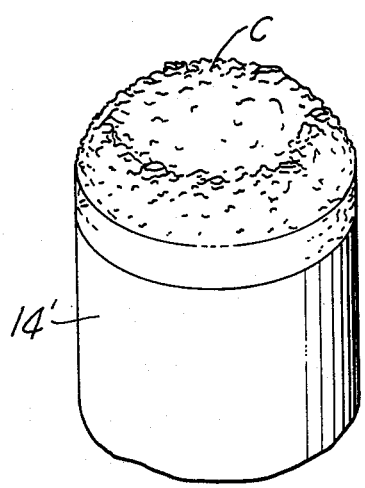
FIG. 3 is a perspective view of the upper and inner end portions of the nib shown in FIG. 2, illustrating the surface appearance of the flow-blocking cap.

As is clearly evident in FIGS. 2 and 3, no ink can enter the nib through the cap C.

In the present invention the ink in the cartridge body 11 is provided with the antioxidant and/or with the corrosion resistant ingredient as disclosed. When the moisture and oxygen enter the ink as a part of the air the antioxidant combines with the oxygen and prevents the latter from reacting with the copper and zinc in the brass to form undesirable by-products. The prevention of these undesirable by-products prevents the formation of crystals in the ink itself.

At the end of the cartridge 11 spaced from the nib the end surface of the ink is exposed to the air. If the body 11 is made of metal, i.e., brass, the factors which produce oxidation at the end of the nib are also present at the line of contact of the ink and the plug. Formation of corrosion by-products here also is prevented according to the present invention by the antioxidant and the corrosion inhibitors in the manner previously described.

The following are examples of various ball point pen ink formulae embodying antioxidants and/or corrosion inhibitors according to the present invention:

EXAMPLE I

| | Parts by Weight |
|---|---|
| Ethylene Glycol Mono Phenyl Ether | 20 |
| Propylene Glycol | 20 |
| Fatty Acid (Oleic Acid Type) | 12 |
| Solvent Blue 5 Dye (such as Victoria Pure Blue BO Base, American Cyanamid Hectolene Pure Blue BO Base, Dye Specialties, Inc.) | 6 |
| Solvent Violet 9 Dye (Crystal Violet Base, BASF, American Dye Specialties, Inc.) | 4 |
| Resin, ketone condensation type | 35 |
| Resin, polyvinyl pyrrolidone type | 3 |
| Mixture of diethylamine salts of bis (octylphenyl) hydrogen phosphate and octylphenyl dihydrogen phosphate (corrosion inhibitor) | 1.0 |
| 3,3-methylene-bis (4-Ethyl-6-Tert-Butyl Phenol) (antioxidant) | 2.0 |
| | 103.0 |

This formula is prepared by measuring the solvents and fatty acids into a jacketed kettle while being warmed and agitated. Both resins are then added and agitated until dissolved following which the dye and corrosion inhibitor are added and agitated until dissolved. The antioxidant is then added and agitated until dissolved. Thereafter the mixture is filtered or centrifuged to removed impurities and insoluble matter and any final adjustments on viscosity and pH are made.

EXAMPLE II

|  | Parts by Weight |
| --- | --- |
| Hexylene Glycol | 8.0 |
| Propylene Glycol | 22.5 |
| Fatty Acid (Oleic Type) | 5.6 |
| Beta Naphthol | 8.0 |
| Solvent Blue 5 Dye (Victoria Pure Blue BO Base, American Cyanamid BASF) | 4.7 |
| Solvent Blue 38 Dye (American Cyanamid, American Aniline, duPont, National Aniline, etc.) | 31.5 |
| Phenol modified Coumarone-Indene Resin | 19.7 |
| Mixture of diethylamine salts of bis (octylphenyl) hydrogen phosphate and octylphenyl dihydrogen phosphate (corrosion inhibitor) | 1.0 |
| 2,2-Methylene bis (4-ethyl-6-tert butyl phenol) (antioxidant) | 2.0 |
|  | 103.0 |

The formula is prepared as described in preparing the Example I formula.

EXAMPLE III

|  | Parts by Weight |
| --- | --- |
| Ethylene Glycol Mono Phenyl Ether | 29.0 |
| Butylene Glycol 1, 3 | 9.4 |
| Diethylene Glycol Mono Phenyl Ether | 9 |
| Fatty Acid (Oleic Type) | 1.5 |
| Di-Phenyl Guanidine | .9 |
| Red Organic Pigment Paste | 7 |
| Solvent Orange 25 Dye (duPont, American Cyanamid) | 10 |
| Solvent Red 49 Dye (Rhodamine B Base, BASF, duPont, National Aniline, American Cyanamid) | 14 |
| Ketone condensation resin | 16 |
| Mixture of diethylamine salts of bis (octylphenyl) hydrogen phosphate and octylphenyl dihydrogen phosphate (corrosion inhibitor) | 1.0 |
| 2,2-Methylene-bis (4-ethyl-6-tert-butyl phenol) (antioxidant) | 2.0 |
|  | 103.0 |

This formula is prepared as described in preparing the Example I formula.

EXAMPLE IV

|  | Parts by Weight |
| --- | --- |
| Ethylene Glycol Mono Phenyl Ether | 11 |
| Diethylene Glycol Mono Phenyl Ether | 30 |
| Saturated Fatty Acid (C-9 to C-11 carbon atoms) | 11 |
| Saturated Fatty Acid (isostearic type) | 5 |
| Solvent Black 7 Dye (National Aniline, BASF, American Cyanamid) | 28 |
| Phenol modified Coumarone Resin | 5.1 |
| Solvent Violet 8 Dye (Methyl Violet base, American Cyanamid, BASF) | 2.5 |
| Carbon Black Dispersion | 5 |
| Polyvinyl Pyrrolidone Resin | 2.4 |
| Mixture of diethylamine salts of bis (octylphenyl) hydrogen phosphate and octylphenyl dihydrogen phosphate (corrosion inhibitor) | 1.0 |
| 2,2-Methylene-bis (4-ethyl-6-tert-butyl phenol) (antioxidant) | 2.0 |
|  | 103.0 |

This formula is prepared as described in preparing the Example I formula.

EXAMPLE V

|  | Parts by Weight |
| --- | --- |
| Dipropylene Glycol | 10 |
| Fatty Acid (Oleic Type) | 9 |
| Carbon Black Dispersion | 4 |
| Phenol modified Coumarone Resin | 63.3 |
| Solvent Blue 5 Dye | 8.5 |
| Solvent Violet 8 Dye | 4.9 |
| Solvent Black 3 Dye (Oil Soluble Deep Black BB, BASF, Fat Black HB, Hoeshst) | .3 |
| Mixture of diethylamine salts of bis (octylphenyl) hydrogen phosphate and octylphenyl dihydrogen phosphate (corrosion inhibitor) | 1.0 |
| 2,2-Methylene-bis (4-ethyl-6-tert butyl phenol) (antioxidant) | 2.0 |
|  | 103.0 |

This formula is prepared as described in preparing the Example I formula.

EXAMPLE VI

|  | Parts by Weight |
| --- | --- |
| Ethylene Glycol Mono Phenyl Ether | 24 |
| Dipropylene Glycol | 23 |
| Fatty Acid (Oleic Type) | 2 |
| Solvent Blue 2 Dye (Victoria Blue base, F4R, BASF) | 2 |
| Solvent Yellow 47 Dye | 8 |
| Ketone condensation resin | 41 |
| Mixture of diethylamine salts of bis (octylphenyl) hydrogen phosphate and octylphenyl dihydrogen phosphate (corrosion inhibitor) | 1.0 |
| 2,2-Methylene-bis (4-ethyl-6-tert butyl phenol) (antioxidant) | 2.0 |
|  | 103.0 |

This formula is prepared as described in preparing the Example I formula.

EXAMPLE VII

|  | Parts by Weight |
| --- | --- |
| Diethylene Glycol Mono Phenyl Ether | 22.5 |
| Butylene Glycol-1,3 | 21.5 |
| Saturated Fatty Acid (Oleic Acid Type) | 6.5 |
| Solvent Red 49 Dye (duPont, General Aniline and Film, American Cyanamid) | 7.0 |
| Solvent Brown 20 Dye (American Cyanamid) | 4.0 |
| Ketone condensation resin | 38.5 |
| Mixture of diethylamine salts of bis (octylphenyl) hydrogen phosphate and octylphenyl dihydrogen phosphate (corrosion inhibitor) | 1.0 |
| 2,2-Methylene-bis (4-ethyl-6-tert butyl phenol) (antioxidant) | 2.0 |
|  | 103.0 |

This formula is prepared as described in preparing the Example I formula.

EXAMPLE VIII

|  | Parts by Weight |
| --- | --- |
| Diethylene Glycol Monophenyl Ether | 41 |
| Saturated Fatty Acid (C-9 to C-11 carbon atoms) | 11 |
| Saturated Fatty Acid (Isostearic Type) | 5 |
| Solvent Black 7 Dye (National Aniline, BASF, American Cyanamid) | 35 |
| Phenol modified Coumarone Resin | 5.1 |
| Solvent Violet 9 Dye (Crystal Violet Base; BASF; American Dye Specialties, Inc.) | .5 |
| Polyvinyl Pyrrolidone Resin | 2.4 |
| 2,2-Methylene-bis (4-ethyl-6-tert butyl phenol) (antioxidant) | 2.0 |
|  | 102.0 |

This formula is prepared as described for Example I except that only the antioxidant additive is added prior to filtering or centrifuging.

EXAMPLE IX

| | Parts by Weight |
|---|---|
| Ethylene Glycol Monophenyl Ether | 41 |
| Saturated Fatty Acid (C-9 to C-11 carbon atoms) | 11 |
| Saturated Fatty Acid (Isostearic Type) | 5 |
| Solvent Black 7 dye (National Aniline, BASF, American Cyanamid) | 32.4 |
| Phenol modified Coumarone Resin | 5.1 |
| Solvent Blue 3 Dye (American Cyanamid, Tenneco Chemicals, Inc.) | .5 |
| Carbon Black Dispersion | 5 |
| Mixture of Diethylamine salts of bis (octylphenyl) hydrogen phosphate and octylphenyl dihydrogen phosphate (corrosion inhibitor) | .5 |
| | 100.5 |

This method is prepared as described in preparing the Example I formula.

EXAMPLE X

| | Parts by Weight |
|---|---|
| Ethylene Glycol Monophenyl Ether | 41 |
| Saturated Fatty Acid (C-9 to C-11 carbon atoms) | 11 |
| Saturated Fatty Acid (Isostearic Type) | 5 |
| Solvent Black 7 Dye, (National Aniline, BASF, American Cyanamid) | 30 |
| Phenol modified Coumarone Resin | 7.5 |
| Solvent Blue 3 Dye (American Cyanamid, Tenneco Chemicals, Inc.) | .5 |
| Carbon Black Dispersion | 5 |
| Mixture of diethylamine salts of bis (octylphenyl) hydrogen phosphate and octylphenyl dihydrogen phosphate (corrosion inhibitor) | .5 |
| | 100.5 |

This method is prepared as described in preparing the Example I formula.

EXAMPLE XI

| | Parts by Weight |
|---|---|
| Ethylene Glycol Mono Phenyl Ether | 10 |
| Propylene Glycol | 30 |
| Fatty Acid (Oleic Type) | 12 |
| Solvent Blue 2 Dye (such as Victoria Blue Base, F4R, BASF) | 6 |
| Solvent Violet 8 Dye (such as Methyl Violet Base, duPont, American Cyanamid, Tenneco Chemicals Co.) | 4 |
| Resin, ketone condensation type | 35 |
| Resin, polyvinyl pyrrolidone type | 3 |
| Mixture of diethylamine salts of bis (octylphenyl) hydrogen phosphate and octylphenyl dihydrogen phosphate (corrosion inhibitor) | .5 |
| | 100.5 |

This method is prepared and described in preparing the Example I formula.

We claim:

1. An improved ball pen ink which is substantially non-corrosive to copper or copper alloy in a ball pen cartridge in the presence of oxygen and moisture, which ink is free of copper or copper alloy particles, and which ink consists essentially of:
   a. liquid polar organic carrier, about 30-70 weight percent;
   b. carrier soluble fatty acid having 4-20 carbon atoms, about 1-25 weight percent;
   c. about 5-50 weight percent of carrier soluble resin selected from the class consisting of coal tar, coumarone, coumarone-indene, phenol-modified-coumarone, phenol-modified-coumarone-indene, hexanetriol phthalate resin, ketone condensate, ketone-aldehyde condensate, pine tar, polyvinylpyrrolidone, zein, and mixtures thereof;
   d. dye, pigment, or mixtures thereof, in an amount suitable for producing the desired colored line; and
   e. carrier soluble additive from the class of (1) antioxidants, (2) corrosion inhibitors, and (3) mixtures thereof,
   where said (1) antioxidants are selected from the group consisting of octylated diphenylamine, isopropoxy diphenylamine, condensate of acetone and diphenylamine, aldol-alpha-naphthylamine, phenyl-beta-naphthylamine, dicyclohexylamine, diaryl-paraphenylene diamine, alkylaryl-para-diphenylene diamine, 2,2-methylene-bis-(4-methyl-6-tertiary butyl phenol), 2,2-methylene-bis-(4-ethyl-6-tertiary butyl phenol, 2,6-ditertiary butyl-4-methyl phenol, styrenated phenol, hindered phenol, polymeric hindered phenol, lauryl-para-aminophenol, stearyl-para-aminophenol, N-acetyl-para-aminophenol, N-butyryl-para-phenol, 2,2-thiobis-(4-methyl-6-tertiary-butyl phenol). 1,1-thiobis-(2-naphthol), hydroquinone, 2,5-ditertiary butylhydroquinone, 2,5-ditertiary amylhydroquinone, monotertiarybutyl hydroquinone, hydroquinone monomethyl ether, hydroquinonemonobenzyl ether, octadecyl-3-(3',5'-ditertiary butyl-4')-hydroxy phenyl propionate, dilauryl propionate, ditertiary butylthiodipropionate, butylated hydroxyanisole, 4-dodecyloxy-2-hydroxybenzophenone, and polymerized tirmethyl dihydroquinoline,
   and said (2) corrosion inhibitors are selected from the group consisting of sorbitan fatty acid ester, trimer acid, nonyl phenoxy acetic acid, N,N'-disalicylol-1,2-propanediamine, bis(octylphenyl) hydrogen phosphate diethylamine, octylphenyldihydrogen phosphate diethylamine, mixtures of said diethylamine salts, mercaptobenzothiazole, sodium-2-mercaptobenzothiazole, 2-phenylbenzothiazole, zinc dibutyl dithiocarbamate and mixtures thereof.
   where said antioxidant, when present, is present in an amount of about 0.5-10 weight percent,
   where said corrosion inhibitor, when present, is present in an amount of about 0.1-5 weight percent, and
   said weight percents of antioxidant and corrosion inhibitor are based on the weight of the ink components: carrier, fatty acid, resin, dye and pigment.

2. The ball pen ink of claim 1 wherein said carrier is a polyhydric alcohol having a surface tension within the range of about 20-60 dynes per square centimeter.

3. The ball pen ink of claim 1 wherein the only additive present in said ink is the antioxidant: 2,2-methylene-bis-(4-methyl-6-tertiary butyl phenol).

4. The ball pen ink of claim 1 wherein the only additive present in said ink is the antioxidant: 2,2-methylene-bis-(4-ethyl-6-tertiary butyl phenol)

5. The ball pen ink of claim 1 wherein the only additive present in said ink is the corrosion inhibitor:
octylphenyl dihydrogen phosphate diethylamine, bis(octylphenyl) hydrogen phosphate diethylamine, and mixtures thereof.

6. The ball pen ink of claim 1 wherein both antioxidant and corrosion inhibitor are present in said ink and said antioxidant is 2,2-methylene-bis-(4-methyl-6-tertiary butyl phenol) or 2,2-methylene-bis-(4-ethyl-6-tertiary butyl phenol) and said corrosion inhibitor is octylphenyl dihydrogen phosphate diethylamine, bis(octylphenyl) hydrogen phosphate diethylamine, or mixtures thereof.

7. The ball pen ink of claim 1 wherein the amount of antioxidant, when present, is about 1–3 weight percent, and the amount of corrosion inhibitor, when present, is about 0.05–2 weight percent.

* * * * *